United States Patent [19]

Gentile et al.

[11] Patent Number: 4,854,484

[45] **Date of Patent: * Aug. 8, 1989**

[54] VISCOUS PRODUCT DISPENSER

[75] Inventors: James L. Gentile, Orange; Joseph P. LaRosa, Danbury; Dean R. Rainey, Clinton, all of Conn.

[73] Assignee: Chesebrough-Pond's Inc., Greenwich, Conn.

[ * ] Notice: The portion of the term of this patent subsequent to Mar. 7, 2006 has been disclaimed.

[21] Appl. No.: 77,913

[22] Filed: Jul. 27, 1987

Related U.S. Application Data

[63] Continuation-in-part of Ser. No. 8,024, Jan. 28, 1987, abandoned.

[51] Int. Cl.$^4$ .......................... G01F 11/00; B67D 5/40

[52] U.S. Cl. ...................................... 222/256; 222/385

[58] Field of Search ............... 222/209, 256, 385, 389, 222/391, 335, 336, 340, 257-259, 95

[56] References Cited

U.S. PATENT DOCUMENTS

| | | | |
|---|---|---|---|
| 3,288,334 | 11/1966 | Corsette | 222/107 |
| 3,420,413 | 1/1969 | Corsette | 222/107 |
| 4,045,938 | 9/1977 | Hansen | 222/389 X |
| 4,134,523 | 1/1979 | Hansen et al. | 222/389 |
| 4,402,431 | 9/1983 | Wiegner et al. | 222/327 X |
| 4,434,916 | 3/1984 | Ruscitti et al. | 222/321 |
| 4,485,943 | 12/1984 | Czech | 222/256 |
| 4,657,161 | 4/1987 | Endo et al. | 222/256 |
| 4,694,977 | 9/1987 | Graf et al. | 222/259 |

FOREIGN PATENT DOCUMENTS 58-122066 7/1983 Japan .

*Primary Examiner*—Michael S. Huppert

*Attorney, Agent, or Firm*—Melvin H. Kurtz

[57] ABSTRACT

A product dispenser for viscous products is described comprising a tubular container, a liquid pump dispenser, and a take-up piston which advances towards the pump dispenser as product is dispensed therethrough from the container. The take-up piston has a central depression to accommodate the lower portions of the housing of the pump dispenser when the piston reaches its uppermost location when the container is nearly fully evacuated of product. Transverse slots cut downwardly in the upper surface of the piston extend radially outwardly from the central depression to the sides of the piston to provide a means to bleed or vent off unwanted air entrapped in product which lies in the central depression.

7 Claims, 2 Drawing Sheets

FIG.3
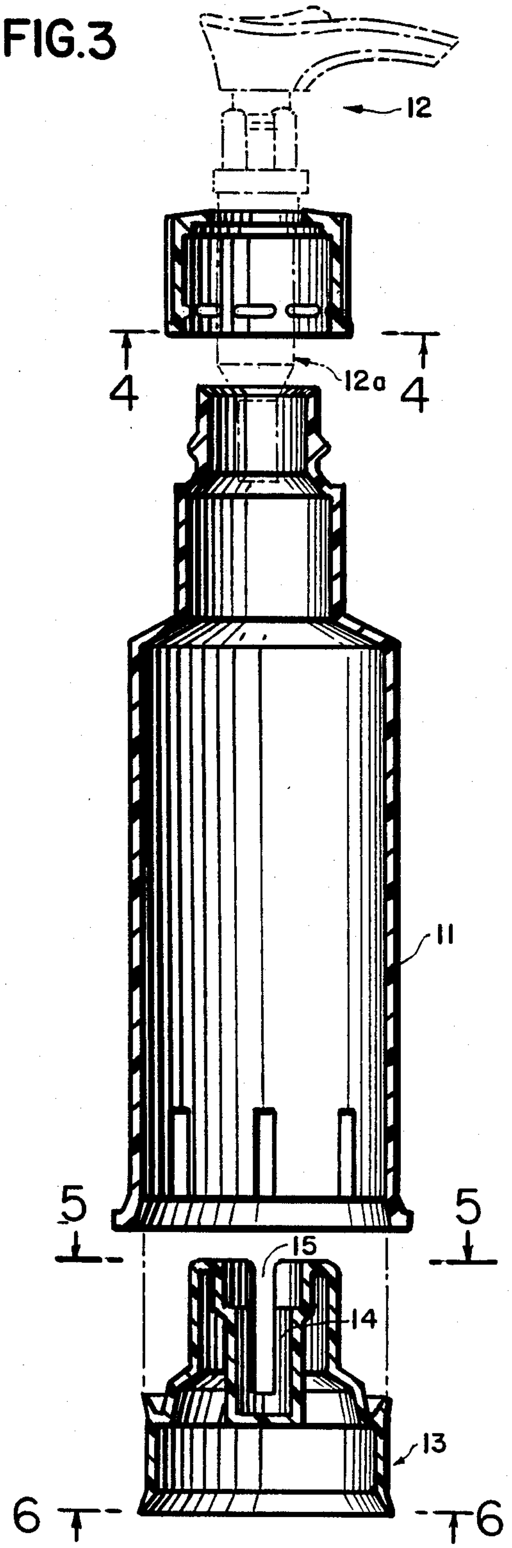
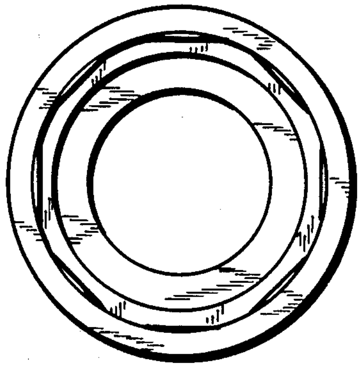
FIG.4
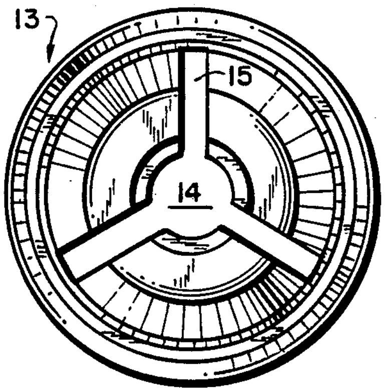
FIG.5
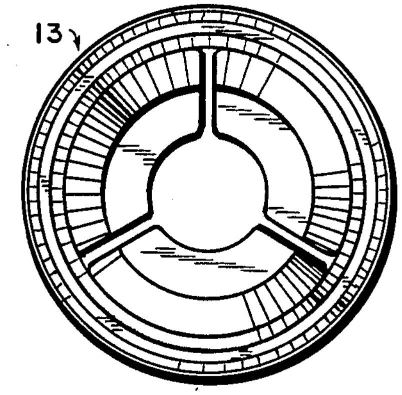
FIG.6

VISCOUS PRODUCT DISPENSER

This application is a continuation-in-part of U.S. Ser. No. 8,024, filed Jan. 28, 1987 now abandoned.

BACKGROUND OF THE PRESENT INVENTION

1. Field of the Present Invention

The present invention is a pump dispenser for viscous fluids, namely creams, lotions and the like.

2. Description of Related Development

In copending U.S. Ser. No. 8,024, filed Jan. 28, 1987, which is incorporated herein by reference, a viscous product dispenser is described and claimed which comprises a tubular container body, a bulk liquid pump dispenser, and a take-up piston which shifts its position towards the pump dispenser as product is discharged from the interior of the container body. The present invention, in a preferred embodiment, is an improved version of the dispenser shown therein and allows for the dispensing therefrom of a greater percentage of product.

SUMMARY OF THE PRESENT INVENTION

The present product dispenser is, in a preferred embodiment, an improved version of the dispenser described and claimed in U.S. Ser. No. 8,024 wherein certain modifications have been made to the take-up piston to insure that the piston can advance, to the maximum extent possible, upwardly inside the tubular container body to dispense product therefrom while providing means to vent any undesired, entrapped air within the product holding sections of the container to insure continued functioning of the dispenser. These objects are achieved by having the upper surface of the piston provided with a centrally located depression to accommodate the lower sections of the pump housing and with transverse slot means, to achieve the desired bleeding off of any entrapped air, leading outwardly from the depression to those portions of the piston surface immediately adjacent the inner side walls of the container.

DESCRIPTION OF THE DRAWINGS

The present invention is further understood by reference to the Drawings which form a portion of the present Specification wherein:

FIG. 3 is an exploded version of the view of FIG. 2; and

FIGS. 4–6 are views of various elements of the dispenser taken along lines 4—4, 5—5, and 6—6, respectively, in FIG. 3 in the direction of the arrows.

DETAILED DESCRIPTION OF THE PRESENT INVENTION

Figure 1:
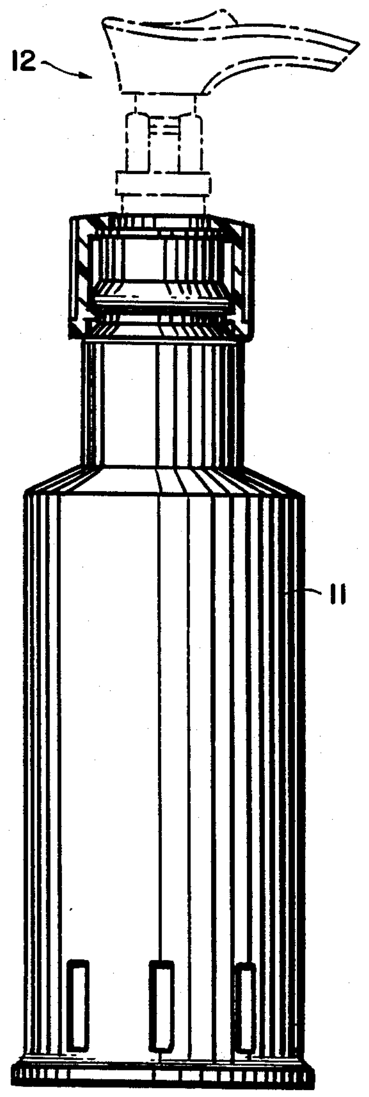
FIG. 1 is a side view of the dispenser of the present invention.
Figure 2:
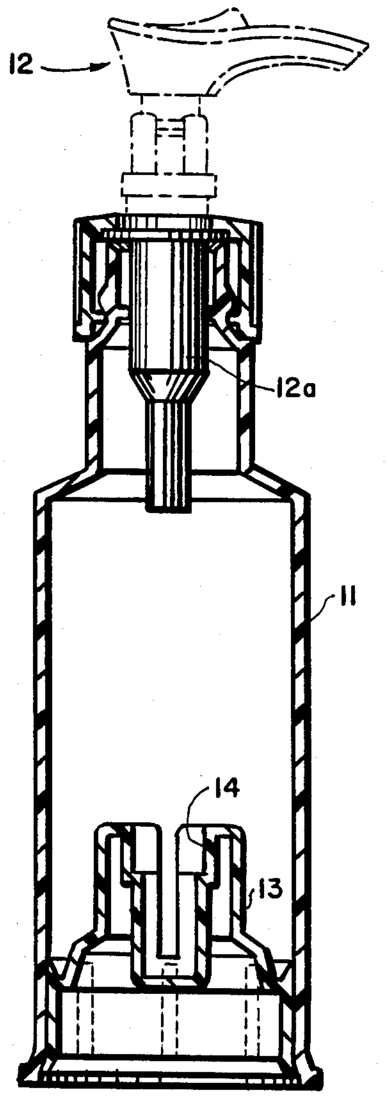
FIG. 2 is a cross-sectional, side view of the dispenser.

FIGS. 1–3 illustrate the dispenser of the present invention which comprises generally tubular container 11, liquid pump dispenser 12, and take-up piston 13. The type of liquid pump dispenser which can be used is well known to persons of ordinary skill in the art and is commercially available from a number of sources including Calmar Inc. of Watchung, N.J. U.S. Ser. No. 8,024, which is incorporated herein by reference, illustrates this pump in more detail, for example, in its FIG. 3. The pump comprises a housing 12a (as shown in FIGS. 2 and 3) which protrudes into the container, below the opening holding the pump dispenser 12. The degree to which this housing protrudes into the opening will normally affect the degree to which take-up piston 13 can approach the outlet opening of the container 11 in which the pump dispenser 12 is located.

The take-up piston 13 in the present dispenser has two essential features which allow for the maximum degree of its upward movement within container 11 to provide for maximum dispensing of product therefrom with provision made for the bleeding off of unwanted air pockets within the material to be dispensed. Firstly, a depression 14 is centrally located in the top surface of the take-up piston 13 to accommodate the lower portion of the housing 12*a* of the pump 12 as the piston 13 reaches the uppermost portions of its travel. This allows the piston 13 to approach as close as possible to the top of the container 11 thereby reducing the space in which liquid product is held to the absolute minimum practical extent. Secondly, transverse slot means 15 (for example, three slots at 120° to one another) extend downwardly from the top surface of piston 13 and extend from the depression 14 to the side of the piston 13 immediately adjacent the inner wall surface of the container 11. These slots allow for bleeding off of any entrapped air in the product to be dispensed since they allow for the entrapped air to migrate to the interface between the sides of the piston 13 and the inner wall surface of the container 11. The tolerances in sealing fit between piston 13 and wall surfaces are close enough to prevent liquid product from leaking past the piston 13 but not so close to preclude unwanted air from being vented past those surfaces out of the chamber defined by the walls of container 11, piston 13 and pump housing 12*a* holding the product.

The foregoing is meant to be illustrative only of certain embodiments of the present invention and should not be construed in a limiting sense. The scope of protection sought is set forth in the claims which follow.

We claim:

1. A dispenser for a highly viscous non flowable product which comprises:
   - (a) a generally tubular container body to hold the product;
   - (b) a liquid pump dispenser, at the upper portion of the container body, which comprises a hand depressible, spring-biased piston/cylinder pumping mechanism in a housing having a product inlet section which extends at least partially into the interior of the container body; and
   - (c) a take-up piston at the lower portion of the container body which responds to discharge of product from the container body by shifting its position towards the upper end of the container so as to decrease the internal volume of the container body holding the product by an amount corresponding to the volume of product discharged, the take-up piston comprising:
     - (i) a depression in its upper surface into which at least a portion of the housing of the pump dispenser can fit when the take-up piston advances into the upper portion of the container body; and
     - (ii) transverse slot means communicating with the depression (i) and the side walls of the container body to allow any entrapped air to bleed off from the space within the container between the take-up piston and the housing of the pump dispenser.

2. A dispenser as claimed in claim 1 wherein three slot means are in communication with the depression and side walls.

3. A dispenser as claimed in claim 1 wherein the depression is centrally located in the upper surface of the piston.

4. A dispenser as claimed in claim 2 wherein the depression is centrally located in the upper surface of the piston.

5. A dispenser as claimed in claim 4 wherein the three slot means are at 120° angles to one another.

6. A dispenser of claim 1 for dispensing petroleum jelly.

7. A dispenser of claim 1 for dispensing cold cream.

* * * * *